Patented Dec. 29, 1953

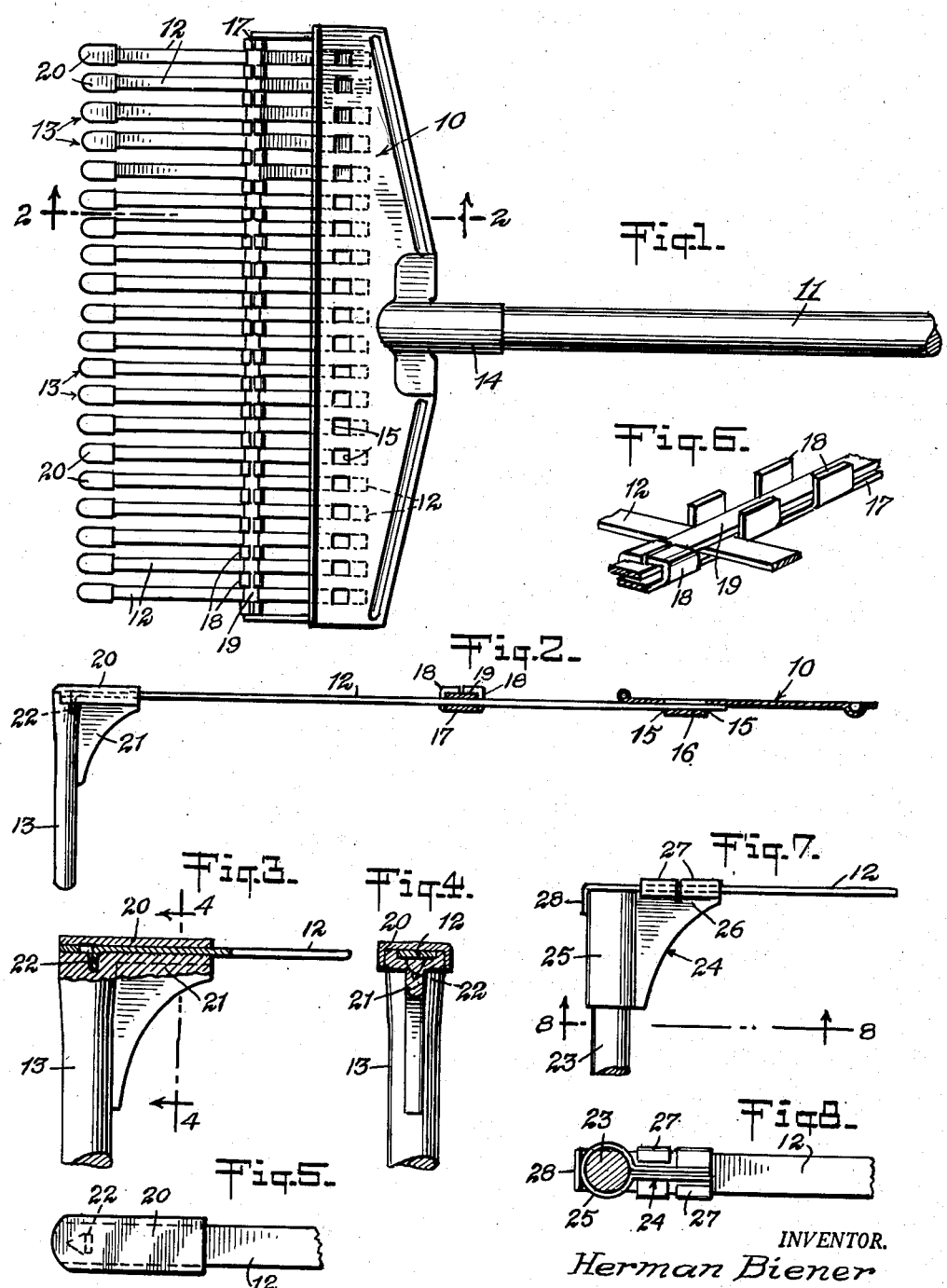

2,663,987

UNITED STATES PATENT OFFICE 2,663,987

RAKE

Herman Biener, Brooklyn, N. Y.

Application January 22, 1952, Serial No. 267,636

1 Claim. (Cl. 56—400.17)

This invention relates to a hand rake which may be used advantageously to remove leaves, cut grass, pieces of paper, pebbles and other objects littering a lawn and other places.

The principal object of the present invention is the provision of a hand rake of improved construction affording the following advantages. It enables raking operations to be carried out conveniently and effectually on uneven terrain. Objects cannot become lodged between the tines or teeth of the rake. Cut grass may be readily raked without uprooting seeds and rooted blades of grass.

The nature of the invention and its distinguishing features and advantages will appear when the following specification is read in conjunction with the accompanying drawing, in which:

Fig. 1 is a top plan view of a rake constructed in accordance with the present invention.

Fig. 2 is an enlarged sectional view taken on the line 2—2 of Fig. 1.

Fig. 3 is an enlarged fragmentary side view of one of the teeth on a shank, portions being shown in section.

Fig. 4 is a sectional view taken on the line 4—4 of Fig. 3.

Fig. 5 is a top plan view of the parts shown in Fig. 3.

Fig. 6 is an enlarged fragmentary perspective view of the teeth shank spacer, some of the lugs thereof being shown disengaged.

Fig. 7 is an enlarged fragmentary side view showing a modified form of tooth.

Fig. 8 is a sectional view taken on the line 8—8 of Fig. 7.

Generally stated, the rake of the present invention comprises a head 10 having a rod handle 11, a plurality of teeth shanks 12, and tines or teeth 13 on the outer ends of shanks 12.

The head 10 is substantially rectangular and is made of sheet metal stamped, bent and formed providing a socket 14 for the handle 11 and pairs of slots 15 with intervening depressed portions 16 of the material of the head. The handle 11 has one end thereof secured in the socket 14 in any suitable manner, and the handle extends at an angle from one side of the head 10.

Each of the shanks 12 is made of a suitable length of narrow and flat spring metal so that each shank is flexible and resilient. There is one pair of slots 15 for each shank 12. The root or inner end of each shank is inserted in the slot 15, and is spot welded to the corresponding depressed portion 16. The shanks 12 are disposed in spaced parallel relation to each other and extend from the head 10 on the side thereof opposite the handle side.

A U shape spacer 17 secured to the head 10 maintains the shanks 12 in the spaced relation to each other. The spacer 17 consists of a strip of metal having lugs 18 bent into engagement with a retaining strip 19 overlying the shanks 12. End portions of the spacer bent at right angles thereto are spot welded to the head 10.

The teeth 13 may be made of different materials, and may be secured to the shanks 12 in different ways by various means.

As shown in Figs. 1 to 5 the teeth 13 are of molded construction and made of plastic material. The upper end of each tooth has upper and lower shank engaging portions 20 and 21 respectively. The tooth is webbed integral with the portion 21. This portion has a dent therein which receives a barb 22 struck from the related shank 12. The upper portion 20 is cemented to the portion 21 after the barb 22 has been engaged, thus securing the tooth to the outer end of the shank.

As an alternate form, each of the teeth 13 may be made of a tapered wooden pin 23 secured to its shank 12 by an attachment 24 cut, bent and formed from a single piece of sheet metal which provides a socket 25 and a webbed shank portion 26 having lugs 27 bent into engagement with the shank 12. The outer end portion 28 of the shank is bent downwardly and abuts the socket 25 to prevent the attachment from sliding off the shank.

The invention is not restricted to the details above described, but includes all-constructions and modifications coming within the scope of the appended claim.

I claim:

A rake having a plurality of shanks, teeth for the outer ends of said shanks, there being one of said teeth for each of said shanks, and means securing each of said teeth to its shank, said means comprising an attaching shank member, said shank member being composed of a top portion and a bottom portion, the outer end of each shank having a projection thereon engaging the bottom portion of its shank member and the top portion of the shank member being secured to the bottom portion, and each of the teeth being formed on the bottom portion of its respective shank member and projecting downwardly therefrom at an angle with respect thereto.

HERMAN BIENER.

References Cited in the file of this patent

UNITED STATES PATENTS

| Number | Name | Date |
| --- | --- | --- |
| 1,239,687 | Hanamma | Sept. 11, 1917 |
| 1,471,989 | Weis | Oct. 23, 1923 |
| 2,603,937 | Gundersen et al. | July 22, 1952 |

FOREIGN PATENTS

| Number | Country | Date |
| --- | --- | --- |
| 405,210 | Germany | Oct. 31, 1924 |